US012120130B2

(12) United States Patent
Philip

(10) Patent No.: US 12,120,130 B2
(45) Date of Patent: Oct. 15, 2024

(54) NETWORK TRAFFIC ROUTING FOR UNCATEGORIZED AND MULTI-CATEGORIZED WEB REQUESTS

(71) Applicant: Bank of America Corporation, Charlotte, NC (US)

(72) Inventor: Charles Philip, Andheri (IN)

(73) Assignee: Bank of America Corporation, Charlotte, NC (US)

( * ) Notice: Subject to any disclaimer, the term of this patent is extended or adjusted under 35 U.S.C. 154(b) by 276 days.

(21) Appl. No.: 17/882,675

(22) Filed: Aug. 8, 2022

(65) Prior Publication Data

US 2024/0048567 A1    Feb. 8, 2024

(51) Int. Cl.
*H04L 9/40*    (2022.01)
(52) U.S. Cl.
CPC ...... *H04L 63/1408* (2013.01); *H04L 63/0281* (2013.01)
(58) Field of Classification Search
None
See application file for complete search history.

(56) References Cited

U.S. PATENT DOCUMENTS

| | | | |
|---|---|---|---|
| 8,453,068 B2 | 5/2013 | Stibel et al. | |
| 8,634,805 B2 | 1/2014 | Raleigh | |
| 8,700,543 B2 | 4/2014 | Glickman | |
| 8,838,643 B2 | 9/2014 | El Daher et al. | |
| 8,904,483 B1 | 12/2014 | Martini | |
| 8,918,395 B2 | 12/2014 | Gehrking et al. | |
| 8,930,294 B2 | 1/2015 | Anandaraj | |
| 9,111,231 B2 | 8/2015 | Kirillov | |
| 9,111,281 B2 | 8/2015 | Stibel et al. | |
| 9,292,701 B1 | 3/2016 | Chebakov et al. | |
| 9,311,423 B1 | 4/2016 | Brown et al. | |
| 9,330,168 B1 | 5/2016 | Brown et al. | |
| 9,892,189 B1 | 2/2018 | Brown et al. | |
| 9,971,813 B2 | 5/2018 | Gehrking et al. | |
| 10,084,734 B2 | 9/2018 | Lu et al. | |
| 10,210,347 B2 | 2/2019 | McCorkendale et al. | |
| 10,469,499 B2 | 11/2019 | Els et al. | |
| 10,757,075 B2 | 8/2020 | Els | |
| 11,144,636 B2 | 10/2021 | Chebakov et al. | |
| 11,245,731 B1 | 2/2022 | Guruswamy et al. | |
| 2010/0205297 A1* | 8/2010 | Sarathy | H04L 43/00 709/224 |

* cited by examiner

*Primary Examiner* — Cai Y Chen
(74) *Attorney, Agent, or Firm* — Banner & Witcoff, Ltd.

(57) ABSTRACT

Aspects of the disclosure relate to traffic routing. The computing platform may receive a first web request, requesting access to a first website. The computing platform may identify that the first website is associated with multiple categorizations. Based on identifying that the first website is associated with the multiple categorizations, the computing platform may redirect the first web request to a threat analysis database engine, which may be configured to output a first network action rule for the first website. The computing platform may access, from the proxy content filtering engine, the first network action rule. The computing platform may execute the first network action, which may include blocking or allowing traffic to the first website.

20 Claims, 11 Drawing Sheets

NETWORK TRAFFIC ROUTING FOR UNCATEGORIZED AND MULTI-CATEGORIZED WEB REQUESTS

BACKGROUND

Aspects of the disclosure relate to traffic routing and network security policies. In some instances, websites may be categorized by an enterprise or vendor, and requests to such websites may be processed based on the categorizations. In some instances, however, websites might not be categorized. In these instances, a request must be made (e.g., to a website categorization vendor) to identify a category for the website prior to allowing traffic to access the corresponding website. This may be a time consuming process, which may result in processing and/or other access delays.

Similarly, in some instances, a website may be categorized into multiple categories. In these instances, one category may indicate that access to a website should be allowed, while another may indicate that access to the website should be blocked. This may result in application of an incorrect network policy for a website, which may, e.g., result in data leakage and/or other threats. Accordingly, it may be advantageous to identify more efficient and accurate methods for applying network security policies for web traffic.

SUMMARY

Aspects of the disclosure provide effective, efficient, scalable, and convenient solutions that address and overcome the technical problems associated with network traffic routing for non-categorized and multi-categorized websites. In accordance with one or more embodiments of the disclosure, a computing platform with at least one processor, a communication interface communicatively coupled to the at least one processor, and memory storing computer-readable instructions may receive a first web request, requesting access to a first website. The computing platform may identify that the first website is associated with multiple categorizations. Based on identifying that the first website is associated with the multiple categorizations, the computing platform may redirect the first web request to a threat analysis database engine, which may be configured to: 1) output a first score indicating an identified amount of danger corresponding to the first website, and 2) store, at a proxy content filtering engine and based on the first score, a first network action rule indicating a first network action to be performed by the computing platform with regard to the first website. The computing platform may access, from the proxy content filtering engine, the first network action rule. The computing platform may execute the first network action, which may include blocking or allowing traffic to the first website.

In one or more instances, outputting the first score may be based on comparison of the multiple categorizations to a list of known dangerous categories. In one or more instances, outputting the first score may be based on analysis of the first website using threat intelligence information corresponding to the first website.

In one or more examples, the threat intelligence information may be obtained from one or more data sources using an application programming interface. In one or more examples, blocking the traffic to the first website may include blocking a port number corresponding to the first website.

In one or more instances, the computing platform may receive a second web request, requesting access to a second website. The computing platform may identify that the second website is not categorized. Based on identifying that the second website not categorized, the computing platform may redirect the second web request to the threat analysis database engine, which may be configured to: 1) output a second score indicating an identified amount of danger corresponding to the second website, and 2) store, at the proxy content filtering engine and based on the second score, a second network action rule indicating a second network action to be performed by the computing platform with regard to the second website. The computing platform may access, from the proxy content filtering engine, the second network action rule. The computing platform may execute the second network action, which may include blocking or allowing traffic to the second website.

In one or more examples, outputting the second score further may include outputting a proposed category for the second website. In one or more examples, the computing platform may send, to a website categorization service, the proposed category and a request to confirm the proposed category. The computing platform may store, for the second website and after receiving confirmation from the website categorization service that the proposed category is accurate, the proposed category.

In one or more instances, the second score is output within a first period of time, and confirmation is received after a second period of time, wherein the first period of time is less than the second period of time. In one or more instances, the computing platform may receive a third web request, requesting access to a third website. The computing platform may identify that the third website has a single category. Based on identifying that the single category of the third website is a permissible category, the computing platform may grant access to the third website. Based on identifying that the single category of the third website is not a permissible category, the computing platform may deny access to the third website.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
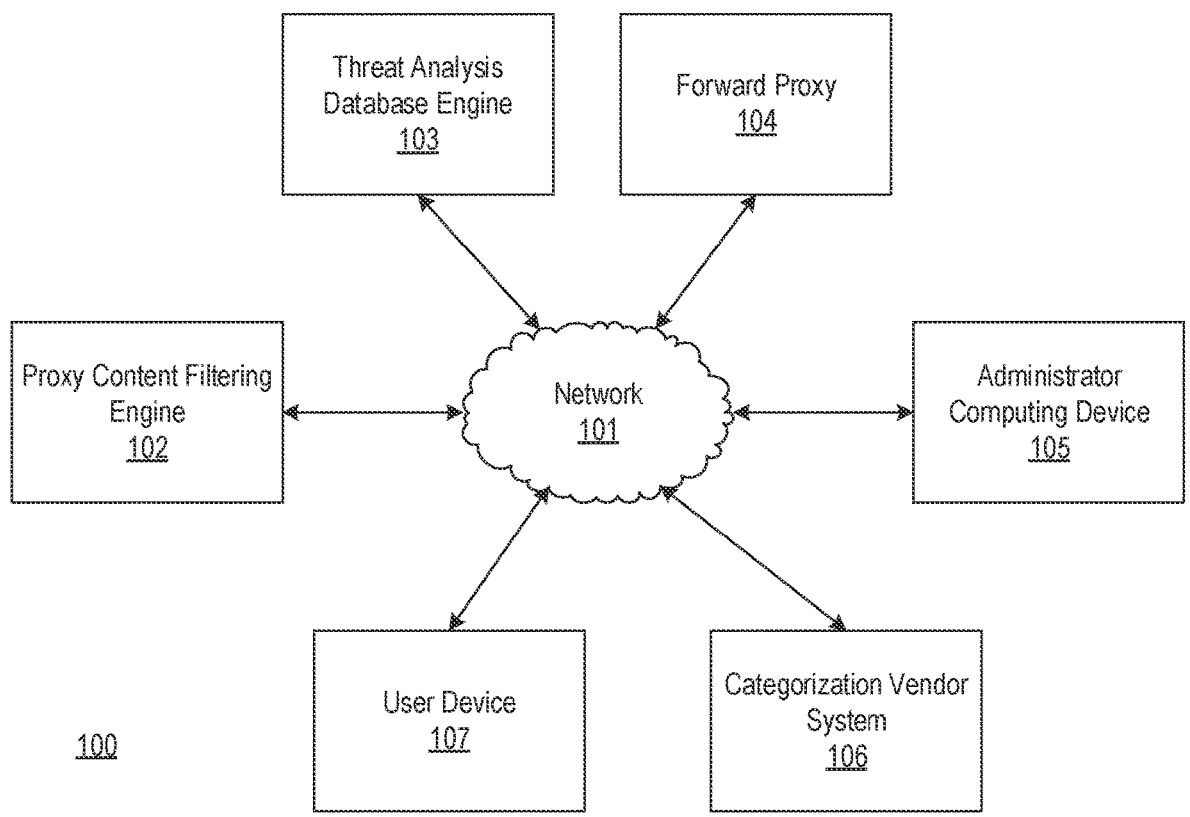
FIGS. 1A-1B depict an illustrative computing environment for enhanced network traffic routing in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to network traffic routing. In some instances, sites may be categorized into multiple categories. If a policy is allowing one of the categories, but blocking a second category within the same web access layer in a later rule, the block rule might not be a match. Conventional techniques and processes are manual and semi-automated, which may be prone to stale baselines, thus resulting in delay in website recategorization or manual blocking. In some instances, service level agreements may vary for uniform resource locator (URL) categorization/re-categorizations submitted. One other issue that may occur with categorization happens when the content filtering subscription expires. When the content filtering subscription expires, all categories may be set to none. Depending on how this policy is configured, this may have some dramatic results. Data leakage threats may exist if websites are not categorized on time examples (e.g., cloud storage sites, peer-to-peer (P2P) file sharing services, or the like). A robust system and process to recognize and inoculate the threat deterrence from accessing uncategorized or wrongly categorized websites are therefore described herein.

To overcome such deficiencies, a highly customized framework and tactics, techniques, and procedures (TTP) to establish a robust process to protect internal networks from Web content threats are described herein. This technique includes analyzing uncategorized websites (none, dual category, suspicious category, or the like) with a threat intelligence database and content filtering engine. The system may be highly customizable for enterprise levels to block websites automatically with recategorizations to vendors. This may provide a highly reliable pathway for dataflow through multiple levels that may help in identifying and blocking of threats.

A user may access a website categorized as "none," which might not have been classified by an allow-listed category. A forward proxy may divert traffic of none/suspicious/dual categories to another proxy. A threat analysis database engine may query the forward proxy on identified traffic, and validate the website with a vulnerability URL database. The threat analysis database engine may send an analyzed result output to a proxy content filtering engine for action and may update the vulnerability URL database, and/or cyber threat intelligence/open-source intelligence (CTI/OSINT) database. If the traffic is suspicious, then firewall rules may be created to block the website port. The proxy content filtering engine may allow/deny filter updates to allow/deny the traffic, and an application programming interface (API) to a webproxy database may categorize the website on a list. The proxy may allow traffic to the website, and any threats may be reported (e.g., to security operation center (SOC) teams or the like).

These and other features are described in further detail below.

Figure 1B:
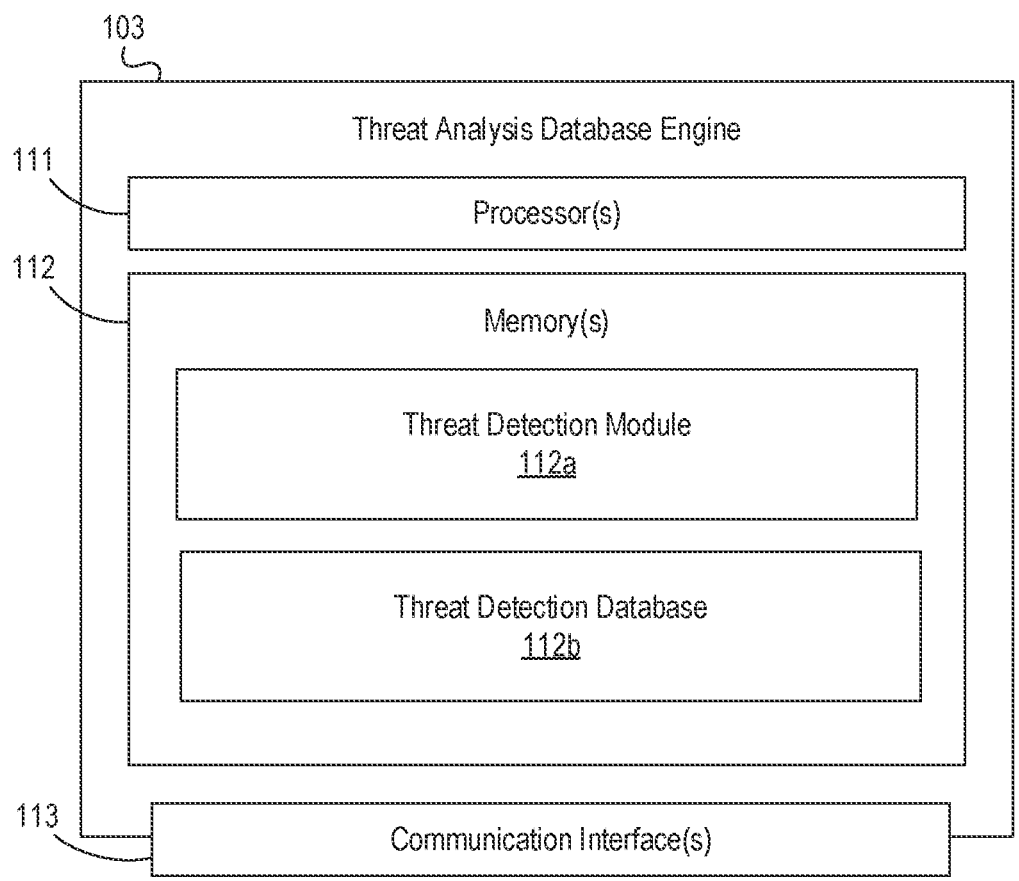

FIGS. 1A-1B depict an illustrative computing environment for enhanced network traffic routing in accordance with one or more example embodiments. Referring to FIG. 1A, computing environment 100 may include one or more computer systems. For example, computing environment 100 may include a proxy content filtering engine 102, a threat analysis database engine 103, forward proxy 104, administrator computing device 105, categorization vendor system 106, and user device 107.

As described further below, proxy content filtering engine 102 may be a computer system that includes one or more computing devices (e.g., servers, server blades, or the like) and/or other computer components (e.g., processors, memories, communication interfaces) that may be used to store network access rules for content filtering and efficient web request processing.

Threat analysis database engine 103 may include one or more computing devices and/or other computer components (e.g., processors, memories, communication interfaces). In some instances, threat analysis database engine 103 may be configured with an application programming interface (API) configured to access one or more sources of threat intelligence information (e.g., indicating threats corresponding to various domains, or otherwise). In some instances, the threat analysis database engine 103 may be configured to use the threat intelligence information to identify a threat score for a requested domain, create a network access rule for the domain based on the threat score, and cause storage of the network access rule for efficient web request processing. Although the threat analysis database engine 103 and the proxy content filtering engine 102 are illustrated as two separate devices, they may, in some instances, be integrated into a single or common device or platform without departing from the scope of the disclosure. In some instances, one or both of the threat analysis database engine 103 and/or the proxy content filtering engine 102 may be integrated into the forward proxy 104 itself.

Forward proxy 104 may be a computer system that includes one or more computing devices (e.g., servers, server blades, or the like) and/or other computer components (e.g., processors, memories, communication interfaces) that may be used to redirect web requests for threat analysis and/or to execute network actions (e.g., blocking web requests, granting web requests, and/or performing other actions).

Administrator computing device 105 may be a laptop computer, desktop computer, mobile device, tablet, smartphone, and/or other device, which may be used to verify and/or otherwise modify network access rules, web categorizations, and/or other information (which may, e.g., have been automatically identified). In some instances, the administrator computing device 105 may be used to set enterprise specific policies (e.g., for the network 101), which may, in some instances, be different than those set by a web categorization vendor. In some instances, administrator computing device 105 may be configured to display one or more user interfaces (e.g., network access interfaces, or the like).

Categorization vendor system 106 may be a laptop computer, desktop computer, mobile device, tablet, smartphone, and/or other device, which may be used to verify and/or otherwise modify network access rules (which may, e.g., have been automatically identified). In some instances, the categorization vendor system 106 may be used to set generic network access rules, web categorizations, and/or other information (which may, e.g., have been automatically identified). In some instances, the policies set by the categorization vendor system 106 may be different than those set at an enterprise level. In some instances, the categorization vendor system 106 may be configured to display one or more user interfaces (e.g., network access interfaces, or the like).

User device 107 may be a laptop computer, desktop computer, mobile device, tablet, smartphone, and/or other device, which may be used to make web requests (e.g., requests to access a particular website). In some instances, the user device 107 may be configured to display one or more user interfaces (e.g., web response interfaces, or the like).

Computing environment 100 also may include one or more networks, which may interconnect proxy content filtering engine 102, threat analysis database engine 103, forward proxy 104, administrator computing device 105, categorization vendor system 106, and user device 107. For example, computing environment 100 may include a network 101 (which may interconnect, e.g., proxy content filtering engine 102, threat analysis database engine 103, forward proxy 104, administrator computing device 105, categorization vendor system 106, and/or user device 107).

In one or more arrangements, proxy content filtering engine 102, threat analysis database engine 103, forward proxy 104, administrator computing device 105, categorization vendor system 106, and/or user device 107 may be any type of computing device capable of sending and/or receiving requests and processing the requests accordingly. For example, proxy content filtering engine 102, threat analysis database engine 103, forward proxy 104, administrator computing device 105, categorization vendor system 106, user device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of proxy content filtering engine 102, threat analysis database engine 103, forward proxy 104, administrator computing device 105, categorization vendor system 106, and/or user device 107 may, in some instances, be special-purpose computing devices configured to perform specific functions.

Referring to FIG. 1B, threat analysis database engine 103 may include one or more processors 111, memory 112, and communication interface 113. A data bus may interconnect processor 111, memory 112, and communication interface 113. Communication interface 113 may be a network interface configured to support communication between threat analysis database engine 103 and one or more networks (e.g., network 101, or the like). Memory 112 may include one or more program modules having instructions that when executed by processor 111 cause threat analysis database engine 103 to perform one or more functions described herein and/or one or more databases that may store and/or otherwise maintain information which may be used by such program modules and/or processor 111. In some instances, the one or more program modules and/or databases may be stored by and/or maintained in different memory units of threat analysis database engine 103 and/or by different computing devices that may form and/or otherwise make up threat analysis database engine 103. For example, memory 112 may have, host, store, and/or include threat detection module 112a, and/or threat detection database 112b.

Threat detection module 112a may have instructions that direct and/or cause threat analysis database engine 103 to analyze web requests, as discussed in greater detail below. Threat detection database 112b may store information used by threat detection module 112a and/or threat analysis database engine 103 in application of advanced techniques to perform threat detection, traffic routing, and/or in performing other functions.

Figure 2A:
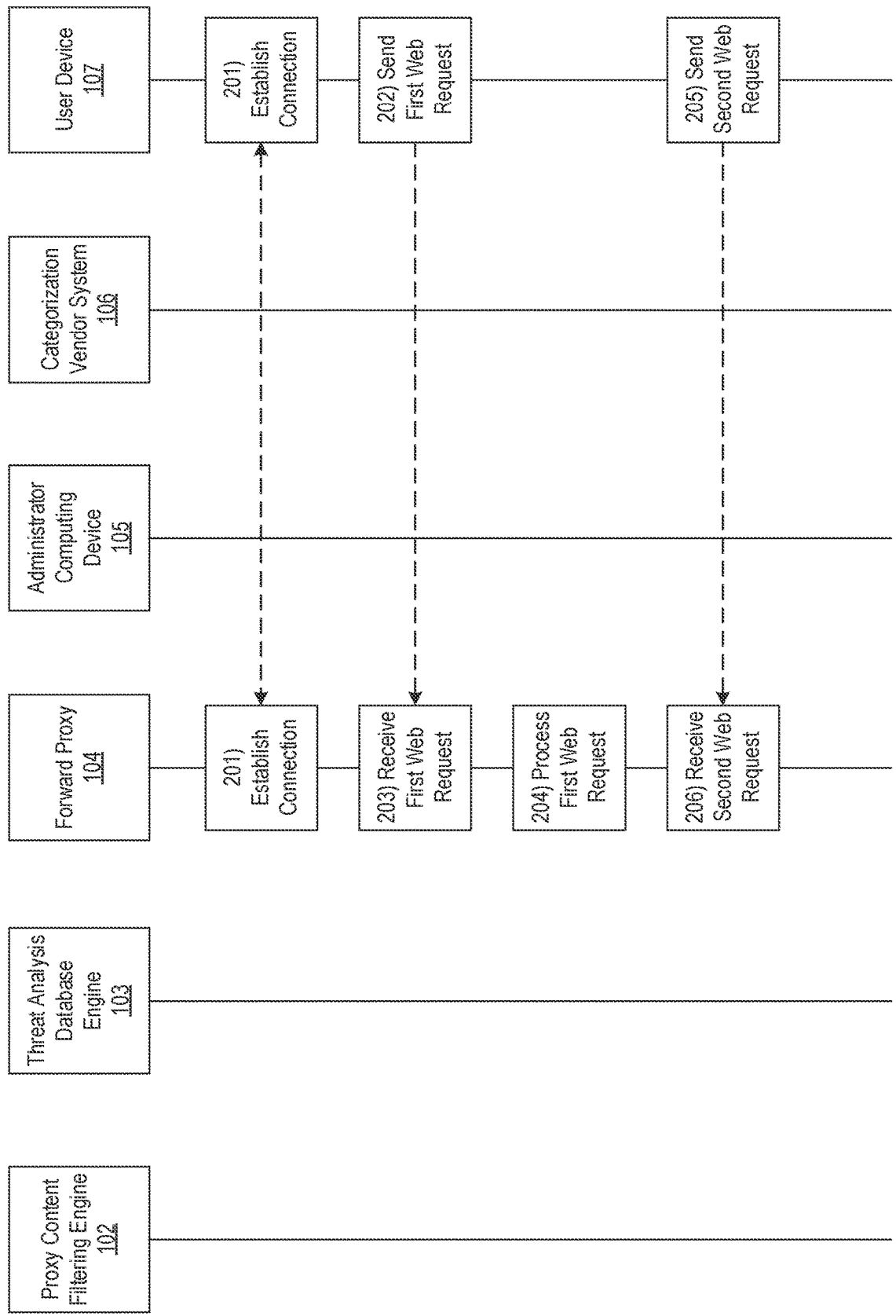
FIGS. 2A-2G depict an illustrative event sequence for enhanced network traffic routing in accordance with one or more example embodiments.

FIGS. 2A-2G depict an illustrative event sequence for enhanced network traffic routing in accordance with one or more example embodiments. Referring to FIG. 2A, at step 201, the user device 107 may establish a connection with the forward proxy 104. For example, the user device 107 may establish a first wireless data connection with the forward proxy 104 to link the user device 107 to the forward proxy 104 (e.g., in preparation for sending web requests). In some instances, the user device 107 may identify whether or not a connection is already established with the forward proxy 104. If a connection is already established with the forward proxy 104, the user device 107 might not re-establish the connection. If a connection is not yet established with the forward proxy 104, the user device 107 may establish the first wireless data connection as described herein.

At step 202, the user device 107 may send a first web request to the forward proxy 104. For example, the user device 107 may send a request to access a first website. In some instances, the user device 107 may send the first web request while the first wireless data connection is established.

At step 203, the forward proxy 104 may receive the first web request. In some instances, the forward proxy 104 may receive the first web request while the first wireless data connection is established.

At step 204, the forward proxy 104 may identify that a first domain for the first website is categorized for processing, and may process the first web request. For example, the forward proxy 104 may identify that a category (e.g., shopping, business, social networking, and/or other categories) assigned to the first domain (e.g., by an enterprise associated with the forward proxy, a categorization vendor, and/or otherwise) indicates that the first web request is safe for processing. In these instances, the forward proxy 104 may grant the user device 107 access to the first website (which may, e.g., involve routing communications between the user device 107 and a web server corresponding to the first website).

At step 205, the user device 107 may send a second web request to the forward proxy 104. For example, the user device 107 may send a request to access a second website. In some instances, the user device 107 may send the second web request while the first wireless data connection is established.

At step 206, the forward proxy 104 may receive the second web request. For example, the forward proxy 104 may receive the second web request while the second wireless data connection is established.

Figure 2B:
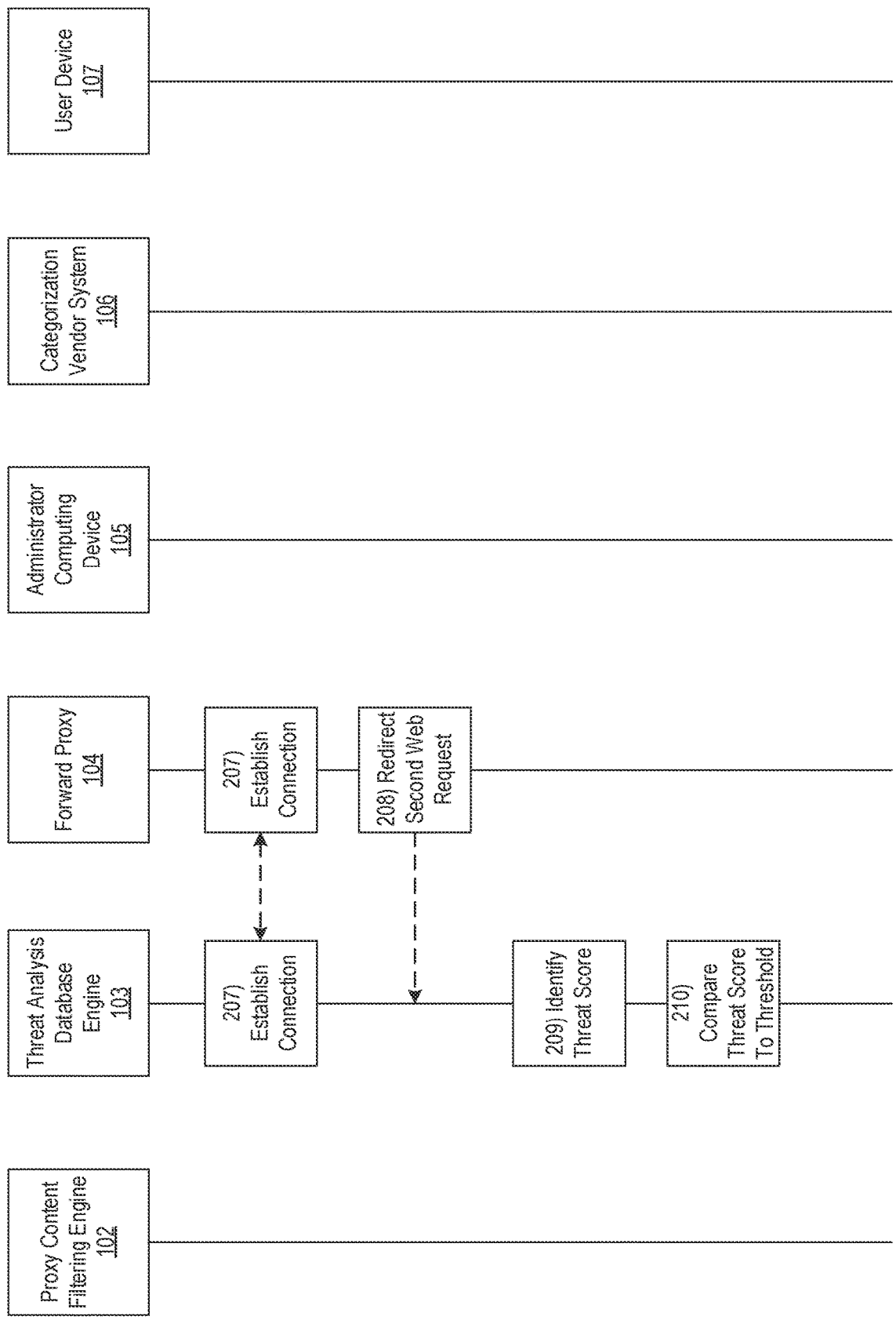

Referring to FIG. 2B, at step 207, the forward proxy 104 may establish a connection with the threat analysis database engine 103. For example, the forward proxy 104 may establish a second connection with the threat analysis database engine 103 to link the forward proxy 104 to the threat analysis database engine 103 (e.g., in preparation for redirecting web requests). In some instances, the forward proxy 104 may identify whether a connection is already established with the threat analysis database engine 103. If a connection is already established with the threat analysis database engine 103, the forward proxy 104 might not re-establish the connection. If a connection is not yet established with the threat analysis database engine 103, the forward proxy 104 may establish the second wireless data connection as described herein.

At step 208, based on identifying that a second domain of the second website is not categorized, the forward proxy 104 may redirect the second web request to the threat analysis database engine 103 (e.g., and away from a server for the second website). In some instances, the forward proxy 104 may redirect the second web request to the threat analysis database engine 103 rather than (or in addition to) sending a request for categorization of the second website to a categorization vendor. In doing so, the forward proxy 104 may obtain a categorization result for the second website in a more expedited manner than if the categorization vendor were to perform the categorization (e.g., due to processing delays, backlogs, and/or other delays).

At step 209, the threat analysis database engine 103 may identify a threat score for the second domain. For example, the threat analysis database engine 103 may be configured with an application programming interface (API), configured to access one or more threat intelligence sources. The threat analysis database engine 103 may access such sources via the API to obtain threat intelligence information for the second domain. Using the threat intelligence information, the threat analysis database engine 103 may output a threat score for the second domain. For example, the threat analysis database engine 103 may input the threat intelligence information into a machine learning model trained to output a threat score based on such information (e.g., by performing a holistic analysis of any corresponding threat indicators). In outputting the threat score, the threat analysis database engine 103 may output a score indicating a likelihood that the domain comprises a threat.

In some instances, the threat analysis database engine 103 may train the machine learning model using labelled data for various websites indicating whether or not the websites comprise threats, and/or the corresponding characteristics of the various websites leading to this identification (e.g., is personal network storage permitted through the website, and/or other characteristics). In these instances, the threat analysis database engine 103 may train the machine learning model based on information from one or more threat intelligence sources, which may be accessed by the machine learning model via an application programming interface of the threat analysis database engine. In some instances, in training the machine learning model, the threat analysis database engine 103 may train a supervised learning model (e.g., support-vector machines, linear regression, logistic regression, naive bayes, linear discriminant analysis, decision trees, k-nearest neighbor algorithm, neural networks, similarity learning, and/or other supervised learning techniques), unsupervised learning model (e.g., clustering, anomaly detection, and/or other unsupervised learning techniques), and/or other model.

Additionally or alternatively, the threat analysis database engine 103 may itself categorize the second website. For example, the threat analysis database engine 103 may categorize the second website based on content, a configuration, affiliations, and/or other information of the website.

At step 210, the threat analysis database engine 103 may compare the threat score to a threshold value. If the threat analysis database engine 103 identifies that the threat score meets or exceeds the threshold, the threat analysis database engine 103 may generate a rule indicating that traffic should not be allowed to access the second website. If the threat analysis database engine 103 identifies that the threat score is less than the threshold, the threat analysis database engine 103 may generate a rule indicating that traffic should be allowed to access the second website. Additionally or alternatively, the threat analysis database engine 103 may generate the rule based on an identified category of the second website. For example, the threat analysis database engine 103 may compare the identified category of the second website to a list of prohibited categories, which may include, for example, personal network storage. In these instances, the threat analysis database engine 103 may identify the rule for the second website based on the comparison.

In some instances, the threat analysis database engine 103 may be configured to dynamically adjust the threshold using a dynamic feedback loop. For example, based on feedback indicating that a rate of unblocked threats is too high, the threat analysis database engine 103 may reduce the threshold (e.g., so as to flag more web requests for blocking and/or further analysis). Similarly, based on feedback indicating that a rate of false positive blocks is too high, the threat analysis database engine 103 may increase the threshold (e.g., so as to flag less web requests for blocking and/or further analysis).

Figure 2C:
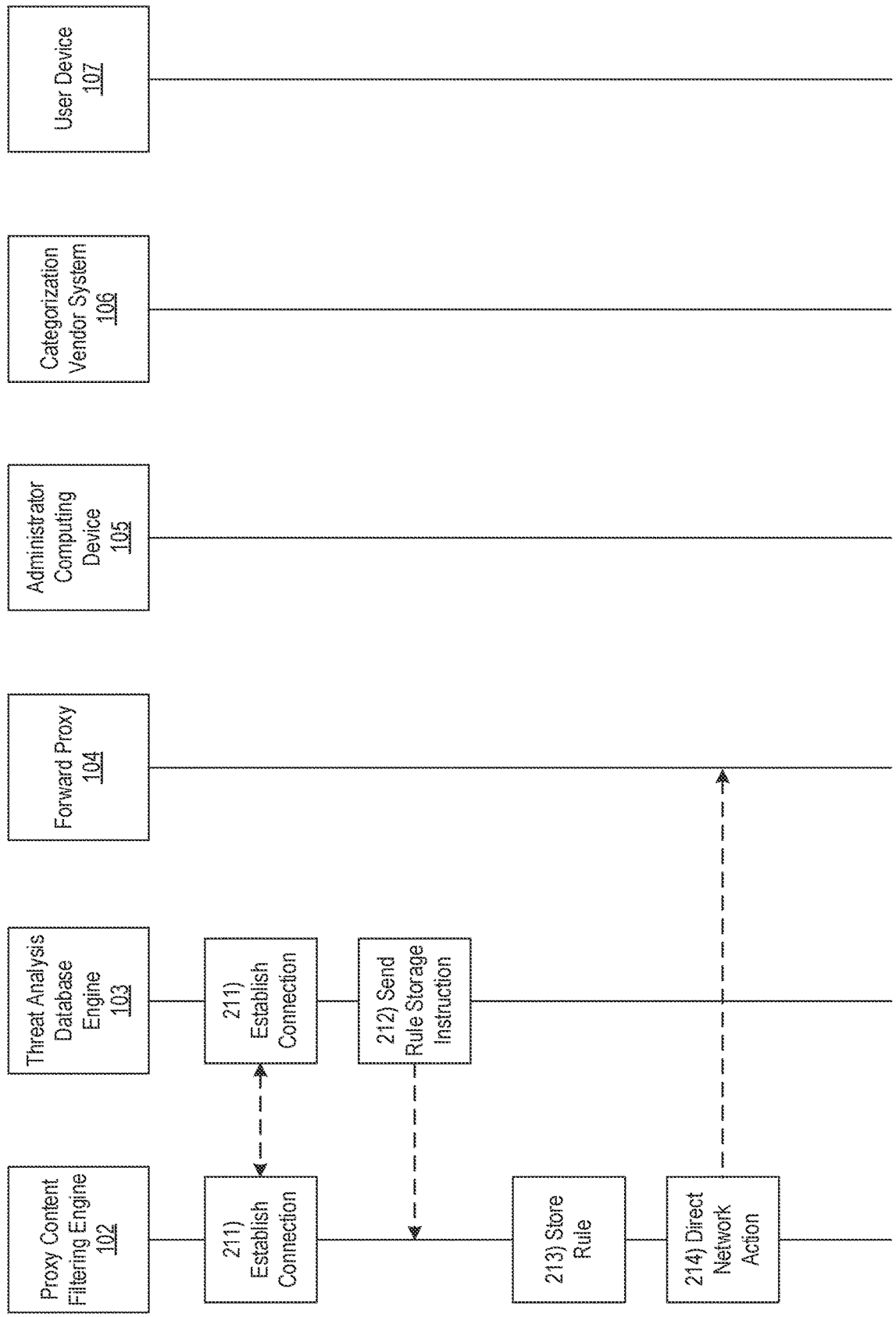

Referring to FIG. 2C, at step 211, the threat analysis database engine 103 may establish a connection with the proxy content filtering engine 102. For example, the threat analysis database engine 103 may establish a third wireless data connection with the proxy content filtering engine 102 to link the threat analysis database engine 103 to the proxy content filtering engine 102 (e.g., in preparation for sending identified rules). In some instances, the threat analysis database engine 103 may identify whether a connection is already established with the proxy content filtering engine 102. If a connection is already yet established, the threat analysis database engine 103 might not re-establish the connection. If a connection is not yet established, the threat analysis database engine 103 may establish the third wireless data connection as described herein.

At step 212, the threat analysis database engine 103 may send the rule for the second website (e.g., identified at step 211) to the proxy content filtering engine 102. For example, the threat analysis database engine 103 may send the rule for the second website via the communication interface 113 and while the third wireless data connection is established. In some instances, the threat analysis database engine 103 may also send one or more commands directing the proxy content filtering engine 102 to store the rule for the second website, which may, e.g., cause the proxy content filtering engine 102 to store the rule for the second website.

At step 213, based on or in response to the one or more commands directing the proxy content filtering engine 102 to store the rule for the second website, the proxy content filtering engine 102 may store the rule for the second website. In doing so, the proxy content filtering engine 102 may make the rule for the second website available to forward proxy 104 for future web requests requesting access to the second website. This may make the process of filtering requests for the second website more efficient going forward, as the threat analysis database engine 103 might not need to repeat the analysis of the second website.

At step 214, the proxy content filtering engine 102 may direct the forward proxy 104 to perform a network action based on the rule for the second website. For example, the proxy content filtering engine 102 may direct the forward proxy 104 to block or approve the request to access the second website based on the rule for the second website, which may, e.g., cause the forward proxy 104 to block or approve the second web request accordingly.

Figure 2D:
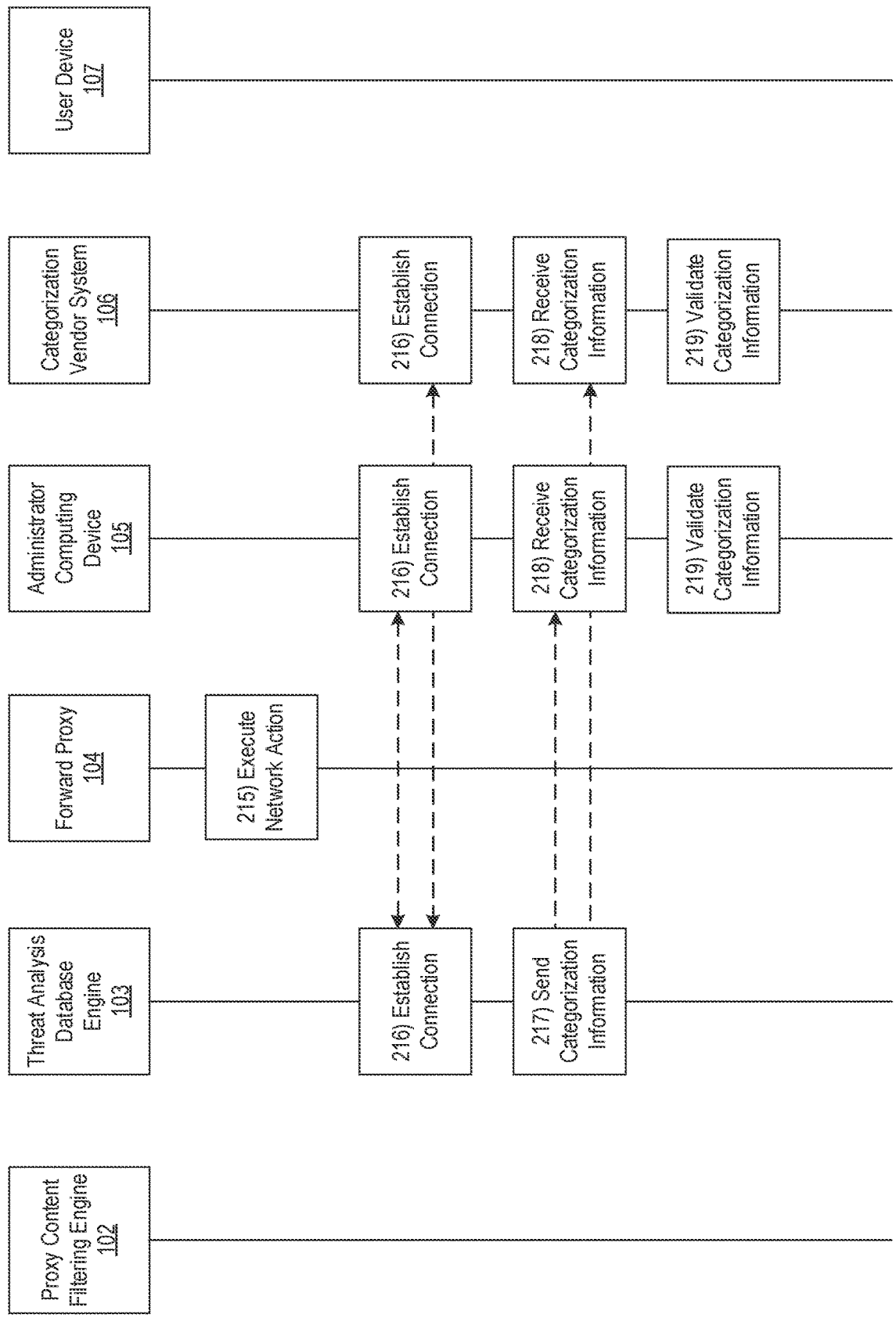

Referring to FIG. 2D, at step 215, based on or in response to the direction from the proxy content filtering engine 102, the forward proxy 104 may execute the corresponding network action. For example, the forward proxy 104 may route the second web request to a server of the second website for processing or block the second web request (e.g., and may notify the user device 107 accordingly). In some instances, in blocking traffic to the second website, the forward proxy 104 may cause a port number for the second website to be blocked (e.g., via a firewall rule). In some instances, in blocking traffic to the second website, the forward proxy 104 may apply uniform resource locator (URL) filtering to block the URL of the second website.

At step 216, the threat analysis database engine 103 may establish wireless data connections with the administrator computing device 105 and/or the categorization vendor system 106. For example, the threat analysis database engine 103 may establish fourth and/or fifth wireless data connections with the administrator computing device 105 and/or categorization vendor system 106 to link the threat analysis database engine 103 to the administrator computing device 105 and/or categorization vendor system 106 (e.g., in preparation for sending categorization information). In some instances, the threat analysis database engine 103 may identify whether connections are already established with the administrator computing device 105 and/or categorization vendor system 106. If connections are already established with the administrator computing device 105 and/or categorization vendor system 106, the threat analysis database engine 103 might not re-establish them. If connections are not yet established with the administrator computing device 105 and/or categorization vendor system 106, the threat analysis database engine 103 may establish the fourth and/or fifth wireless data connections as described herein.

At step 217, the threat analysis database engine 103 may send categorization information and/or the identified rule for the second website to the administrator computing device 105 and/or the categorization vendor system 106. For example, the threat analysis database engine 103 may send the categorization information and/or the identified rule for the second website to the administrator computing device 105 and/or the categorization vendor system 106 while the fourth and/or fifth wireless data connections are established. In doing so, the threat analysis database engine 103 may, in essence, send the output of the threat analysis database engine 103 for confirmation by an administrator and/or categorization vendor, which may allow for override of the determined categorization and/or identified rule. Furthermore, this may allow for further confirmation of the determined categorization and/or identified rule without causing processing delays, which may be associated with such confirmation and/or initial categorizations/rule identification, if such determinations were to be initially made by the administrator computing device 105 and/or categorization vendor system 106 rather than the threat analysis database engine 103. For example, analysis by the administrator computing device 105 and/or categorization vendor system 106 may take longer than analysis by the threat analysis database engine 103. Furthermore, by not relying on the administrator computing device 105 and/or categorization vendor system 106 for the initial categorization, the forward proxy 104 may have its network policies automatically updated in a more expedited manner.

At step 218, the administrator computing device 105 and/or categorization vendor system 106 may receive the categorization information and/or identified rule for the second website. For example, the administrator computing device 105 and/or categorization vendor system 106 may receive the categorization information and/or identified rule for the second website while the fourth and/or fifth wireless data connections are established.

In some instances, the user device 107 may also be notified of the categorization information and/or identified rule for the second website. In these instances, the user device 107 may be configured to receive input requesting an exception or modification to the rule for the second website, which may, e.g., cause the threat analysis database engine 103 to update the rule, cause further analysis by the threat analysis database engine 103, administrator computing device 105, and/or categorization vendor system 106, and/or cause additional actions to be performed that may result in modification of the rule for the second website.

Figure 4:
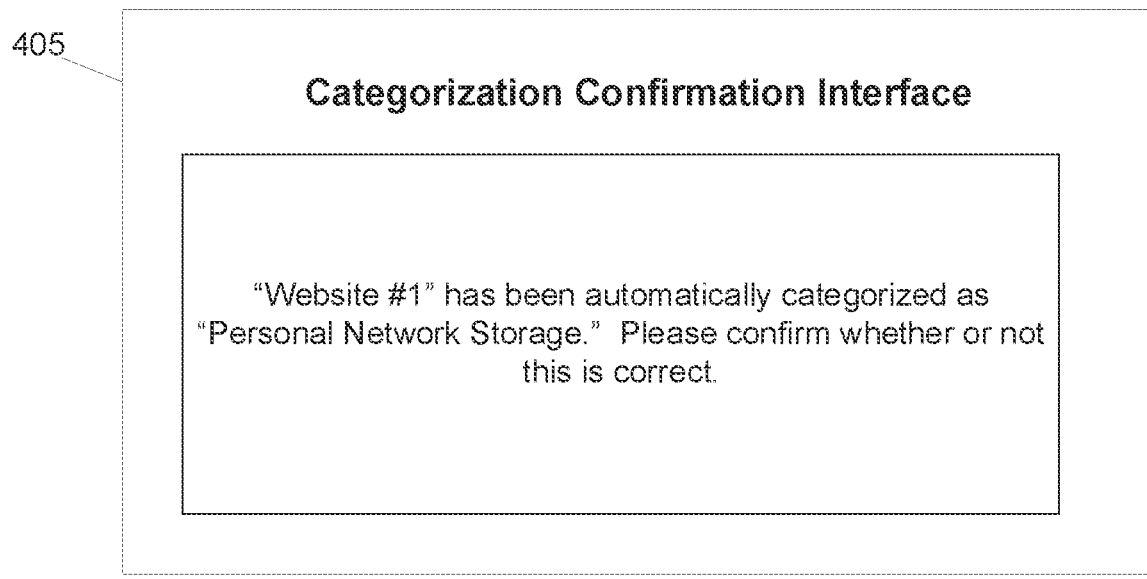
FIG. 4 depicts an illustrative graphical user interface for enhanced network traffic routing in accordance with one or more example embodiments.

At step 219, the administrator computing device 105 and/or categorization vendor system 106 may validate the categorization information and/or identified rule for the second website. For example, the validation may occur automatically, via manual review, and/or otherwise. In some instances, the administrator computing device 105 and/or categorization vendor system 106 may display a graphical user interface similar to graphical user interface 405 in FIG. 4. In these instances, a user may be able to select a different categorization, input a confirmation, and/or take other actions, which may, in some instances, cause modification of the categorization information and/or identified rule at the threat analysis database engine 103.

In some instances, if the categorization information and/or identified rule are to be modified, the administrator computing device 105 and/or categorization vendor system 106 may send one or more commands directing the proxy content filtering engine 102 and/or threat analysis database engine 103 to update the categorization information and/or rule accordingly, which may, e.g., cause the proxy content filtering engine 102 and/or threat analysis database engine 103 to update the categorization information and/or rule for the second website accordingly. In some instances, if the categorization information and/or identified rule are modified, the threat analysis database engine 103 may update the machine learning model used to identify the categorization information and/or threat score by inputting the modification information into the machine learning model. In doing so, the threat analysis database engine 103 may continuously and dynamically train, refine, and/or otherwise update the machine learning model so as to improve accuracy and predictive abilities of the machine learning model for the purpose of identifying network action rules.

Figure 2E:
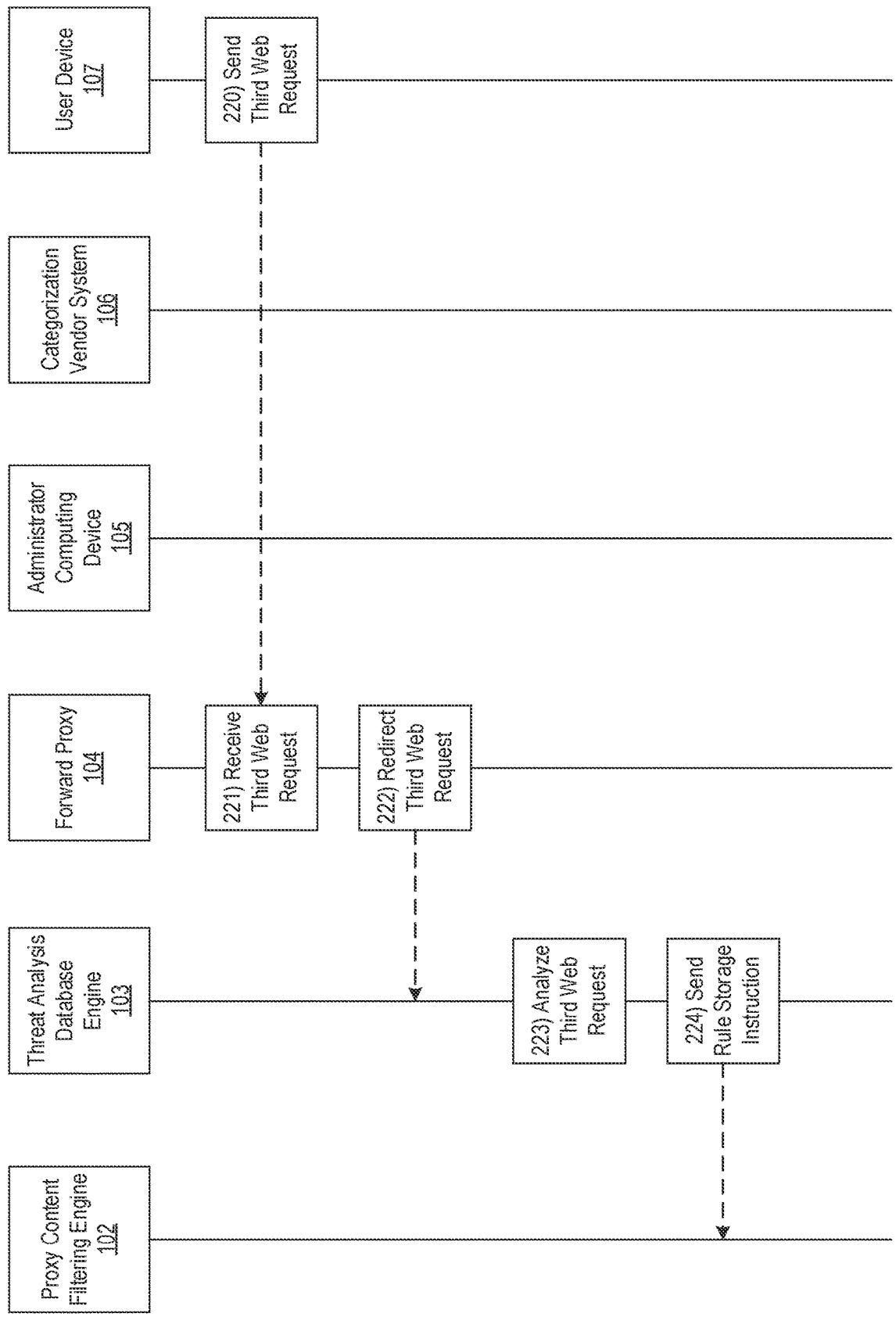

Referring to FIG. 2E, at step 220, the user device 107 may send a third web request to the forward proxy 104. For example, the user device 107 may send a request to access a third website. In some instances, the user device 107 may send the third web request while the first wireless data connection is established.

At step 221, the forward proxy 104 may receive the third web request. For example, the forward proxy 104 may receive the third web request while the first wireless data connection is established.

At step 222, the forward proxy 104 may redirect the third web request to the threat analysis database engine 103. For example, the forward proxy 104 may redirect the third web request to the threat analysis database engine 103 based on or in response to identifying that the third website is categorized with multiple categories (e.g., business, shopping, web advertising, personal network storage, and/or other categories). For example, the forward proxy 104 may perform this redirection as a first category of the third website (e.g., business) may be acceptable, and may suggest to the forward proxy that the third web request should be processed. However, a second category of the third website (e.g., personal network storage) might not be acceptable, and may suggest to the forward proxy 104 that the third web request should be blocked. If only the first category were to be analyzed by the forward proxy 104, however, access may be granted to the third website despite it being categorized for blocking.

At step 223, the threat analysis database engine 103 may analyze the third web request. In some instances, this analysis may include identification of a threat score as described above at step 209 with regard to the third website. In these instances, the threat analysis database engine 103 may similarly compare the threat score to a threshold, and may generate a network action rule for the third website accordingly (e.g., block traffic if the threshold is met or exceeded and allow traffic if the threshold is not met). Additionally or alternatively, this analysis may include comparing each of the identified categories assigned to the third website to a list of prohibited categories (e.g., which may, for example, include personal network storage and/or other prohibited categories). If the threat analysis database engine 103 identifies that the third website does include a prohibited category, it may generate a network action rule indicating that the third website should be blocked. Otherwise, the threat analysis database engine 103 may generate a network action rule indicating that the third website should not be blocked.

At step 224, the threat analysis database engine 103 may send the rule for the third website (e.g., identified at step 223) to the proxy content filtering engine 102. For example, the threat analysis database engine 103 may send the rule for the third website via the communication interface 113 and while the third wireless data connection is established. In some instances, the threat analysis database engine 103 may also send one or more commands directing the proxy content filtering engine 102 to store the rule for the third website, which may, e.g., cause the proxy content filtering engine 102 to store the rule for the third website.

Figure 2F:
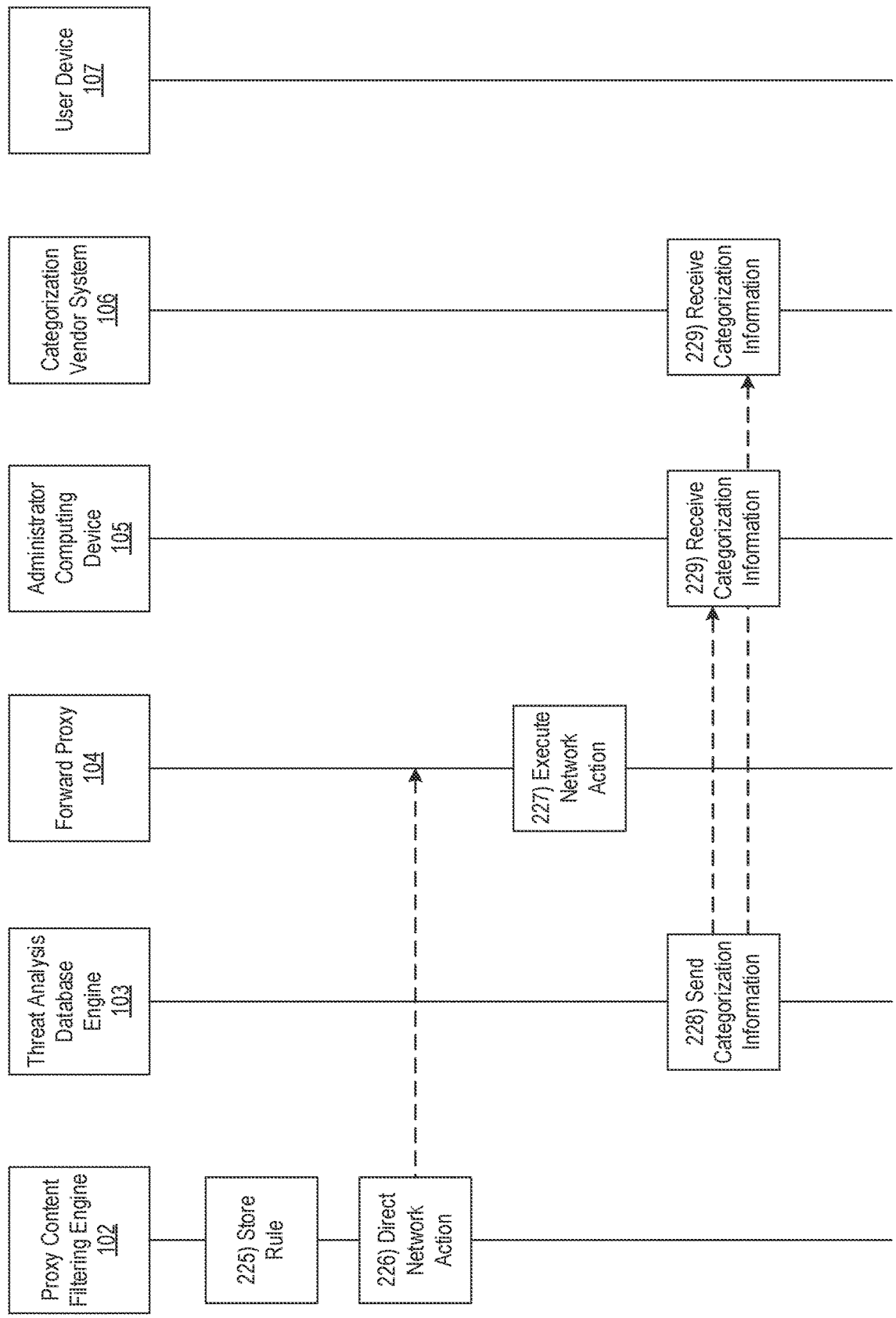

Referring to FIG. 2F, at step 225, based on or in response to the one or more commands directing the proxy content filtering engine 102 to store the rule for the third website, the proxy content filtering engine 102 may store the rule for the third website. In doing so, the proxy content filtering engine 102 may make the rule for the third website available to forward proxy 104 for future web requests requesting access to the third website. This may make the process of filtering requests for the third website more efficient going forward, as the threat analysis database engine 103 might not need to repeat the analysis of the third website.

At step 226, the proxy content filtering engine 102 may direct the forward proxy 104 to perform a network action based on the rule for the third website. For example, the proxy content filtering engine 102 may direct the forward proxy 104 to block or approve the request to access the third website based on the rule for the third website, which may, e.g., cause the forward proxy 104 to block or approve the third web request accordingly.

At step 227, based on the direction from the proxy content filtering engine 102, the forward proxy 104 may execute the corresponding network action. For example, the forward proxy 104 may route the third web request to a server of the third website for processing or block the third web request (e.g., and may notify the user device 107 accordingly). In some instances, in blocking traffic to the third website, the forward proxy 104 may cause a port number for the third website to be blocked (e.g., via a firewall rule). In some instances, in blocking traffic to the third website, the forward proxy 104 may apply URL filtering to block a URL of the third website.

At step 228, the threat analysis database engine 103 may send categorization information and/or the identified rule for the third website to the administrator computing device 105 and/or the categorization vendor system 106. For example, the threat analysis database engine 103 may send the categorization information and/or the identified rule for the third website to the administrator computing device 105 and/or the categorization vendor system 106 while the fourth and/or fifth wireless data connections are established. In doing so, the threat analysis database engine 103 may, in essence, send the output of the threat analysis database engine 103 for confirmation by an administrator and/or categorization vendor, which may allow for override of the determined categorization and/or identified rule. Furthermore, this may allow for further confirmation of the determined categorization and/or identified rule without causing processing delays, which may be associated with such confirmation and/or initial categorizations/rule identification, if such determinations were to be initially made by the administrator computing device 105 and/or categorization vendor system 106 rather than the threat analysis database engine 103. For example, analysis by the administrator computing device 105 and/or categorization vendor system 106 may take longer than analysis by the threat analysis database engine 103. Furthermore, by not relying on the administrator computing device 105 and/or categorization vendor system 106 for the initial categorization, the forward proxy 104 may have its network policies automatically updated in a more expedited manner.

At step 229, the administrator computing device 105 and/or categorization vendor system 106 may receive the categorization information and/or identified rule for the third website. For example, the administrator computing device 105 and/or categorization vendor system 106 may receive the categorization information and/or identified rule for the third website while the fourth and/or fifth wireless data connections are established.

In some instances, the user device 107 may also be notified of the categorization information and/or identified rule for the third website. In these instances, the user device 107 may be configured to receive input requesting an exception or modification to the rule for the third website, which may, e.g., cause the threat analysis database engine 103 to update the rule, cause further analysis by the threat analysis database engine 103, administrator computing device 105, and/or categorization vendor system 106, and/or cause additional actions to be performed that may result in modification of the rule for the third website.

Figure 2G:
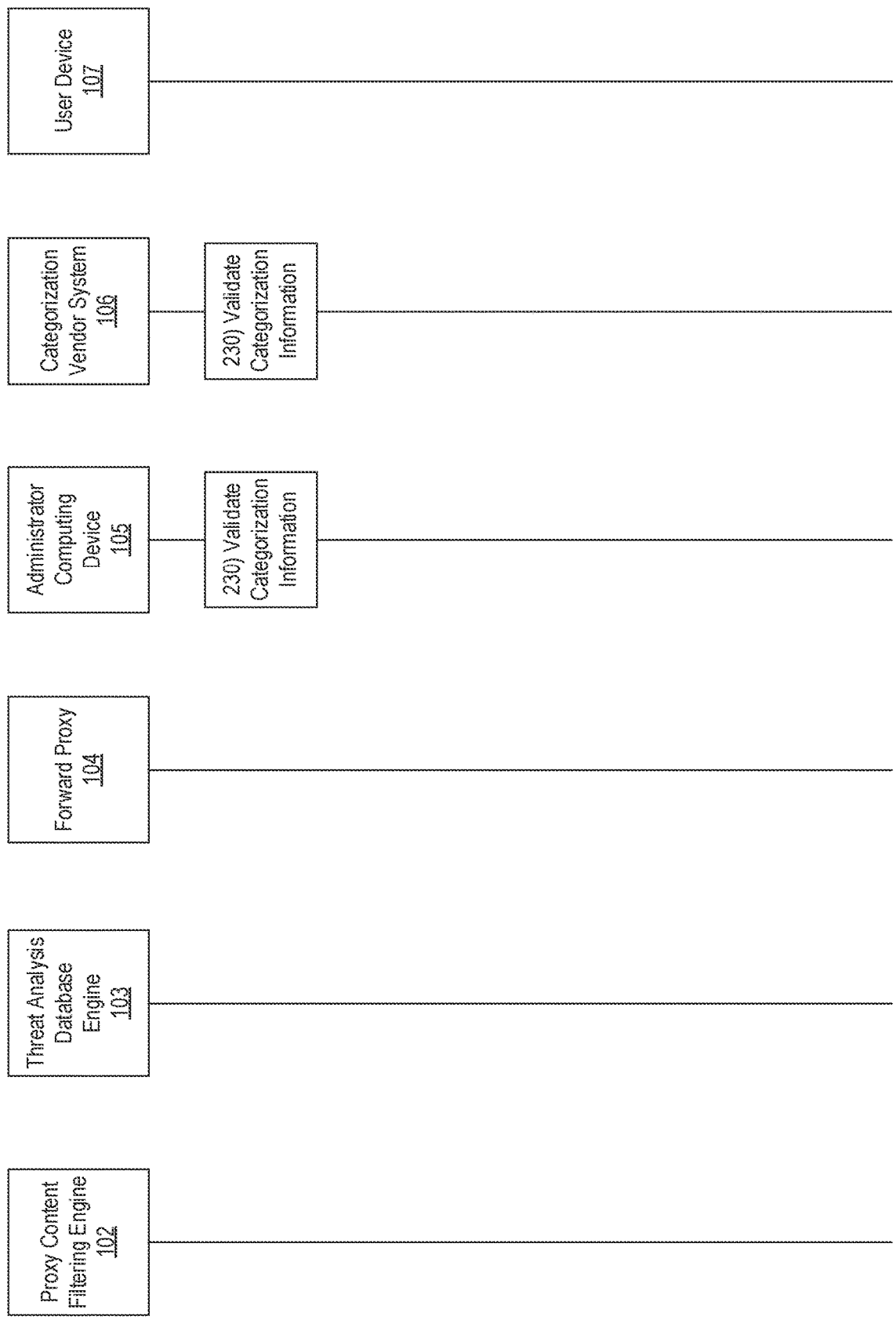

Referring to FIG. 2G, at step 230, the administrator computing device 105 and/or categorization vendor system 106 may validate the categorization information and/or identified rule for the third website. For example, the validation may occur automatically, via manual review, and/or otherwise. In some instances, the administrator computing device 105 and/or categorization vendor system 106 may display a graphical user interface similar to graphical user interface 405 in FIG. 4. In these instances, a user may be able to select a different categorization, input a confirmation, and/or take other actions, which may, in some instances, cause modification of the categorization information and/or identified rule at the threat analysis database engine 103.

In some instances, if the categorization information and/or identified rule are to be modified, the administrator computing device 105 and/or categorization vendor system 106 may send one or more commands directing the proxy content filtering engine 102 and/or threat analysis database engine 103 to update the categorization information and/or rule accordingly, which may, e.g., cause the proxy content filtering engine 102 and/or threat analysis database engine 103 to update the categorization information and/or rule for the third website accordingly.

In some instances, if the categorization information and/or identified rule are modified, the threat analysis database engine 103 may update the machine learning model used to identify the categorization information and/or threat score by inputting the modification information into the machine learning model. In doing so, the threat analysis database engine 103 may continuously and dynamically train, refine, and/or otherwise update the machine learning model so as to improve accuracy and predictive abilities of the machine learning model for the purpose of identifying network action rules.

Although the above described event sequence describes analysis of web requests that are either multi-categorized or not categorized at all, analysis of any web requests otherwise identified as suspicious may be performed in a similar method to that described above without departing from the scope of the disclosure.

Figure 3:
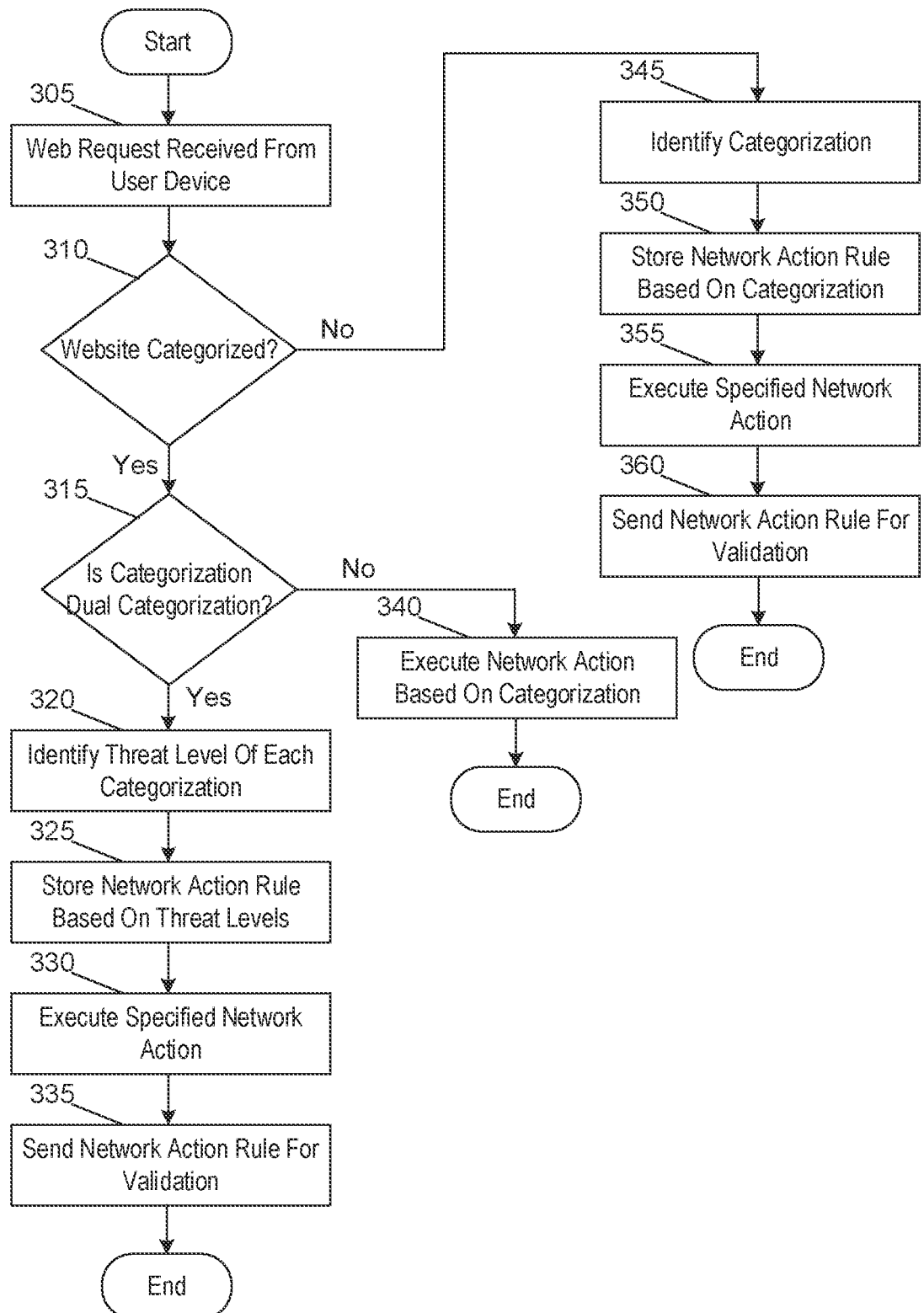
FIG. 3 depicts an illustrative method for enhanced network traffic routing in accordance with one or more example embodiments.

FIG. 3 depicts an illustrative method for implementing enhanced network traffic routing in accordance with one or more example embodiments. At step 305, a computing platform having at least one processor, a communication interface, and memory may receive a web request, requesting access to a website, from a user device. At step 310, the computing platform may identify whether the website is categorized. If the website is not categorized, the computing platform may proceed to step 345. If the website is categorized, the computing platform may proceed to step 315.

At step 345, the computing platform may identify a categorization and/or threat score for the website. At step 350, the computing platform may store a network action rule based on the categorization. At step 355, the computing platform may execute a network action based on the network action rule. At step 360, the computing platform may send the network action rule to other systems for validation.

Returning to step 310, if the computing platform identified that the website is categorized, the computing platform may proceed to step 315. At step 315, the computing platform may identify whether the website has multiple categorizations. If the website does not have multiple categorizations, the computing platform may proceed to step 340. If the website does have multiple categorizations, the computing platform may proceed to step 320. At step 340, the computing platform may execute a network action based on the categorization.

Returning to step 315, if the computing platform identified that the website does have multiple categorizations, the computing platform may proceed to step 320. At step 320, the computing platform may identify a threat level of each categorization. At step 325, the computing platform may store a network action rule based on the categorizations. At step 330, the computing platform may execute a specified network action based on the network action rule. At step 335, the computing platform may send the network action rule for validation by one or more other systems.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and memory storing computer-readable instructions that, when executed by the at least one processor, cause the computing platform to:

receive a first web request requesting access to a first website;

identify that the first website is associated with multiple categorizations;

based on identifying that the first website is associated with the multiple categorizations, redirect the first web request to a threat analysis database engine, wherein the threat analysis database engine is configured to:

output a first score indicating an identified amount of danger corresponding to the first website, and store, at a proxy content filtering engine and based on the first score, a first network action rule indicating a first network action to be performed by the computing platform with regard to the first website, access, from the proxy content filtering engine, the first network action rule; and execute the first network action, wherein executing the first network action comprises one of: blocking or allowing traffic to the first website.

2. The computing platform of claim 1, wherein outputting the first score is based on comparison of the multiple categorizations to a list of known dangerous categories.

3. The computing platform of claim 1, wherein outputting the first score is based on analysis of the first website using threat intelligence information corresponding to the first website.

4. The computing platform of claim 3, wherein the threat intelligence information is obtained from one or more data sources using an application programming interface.

5. The computing platform of claim 1, wherein blocking the traffic to the first website comprises blocking a port number corresponding to the first website.

6. The computing platform of claim 1, wherein the computing platform stores additional computer-readable instructions that, when executed by the one or more processors, cause the computing platform to:

receive a second web request, requesting access to a second website;

identify that the second website is not categorized;

based on identifying that the second website not categorized, redirect the second web request to the threat analysis database engine, wherein the threat analysis database engine is configured to:

output a second score indicating an identified amount of danger corresponding to the second website, and store, at the proxy content filtering engine and based on the second score, a second network action rule indicating a second network action to be performed by the computing platform with regard to the second website, access, from the proxy content filtering engine, the second network action rule; and execute the second network action, wherein executing the second network action comprises one of: blocking or allowing traffic to the second website.

7. The computing platform of claim 6, wherein outputting the second score further includes outputting a proposed category for the second website.

8. The computing platform of claim 7, wherein the computing platform stores additional computer-readable instructions that, when executed by the one or more processors, cause the computing platform to:

send, to a website categorization service, the proposed category and a request to confirm the proposed category; and store, for the second website and after receiving confirmation from the website categorization service that the proposed category is accurate, the proposed category.

9. The computing platform of claim 8, wherein the second score is output within a first period of time, and confirmation is received after a second period of time, wherein the first period of time is less than the second period of time.

10. The computing platform of claim 1, wherein the computing platform stores additional computer-readable instructions that, when executed by the one or more processors, cause the computing platform to:

receive a third web request, requesting access to a third website;

identify that the third website has a single category;

based on identifying that the single category of the third website is a permissible category, grant access to the third website; and based on identifying that the single category of the third website is not a permissible category, deny access to the third website.

11. A method comprising:

at a computing platform comprising at least one processor, a communication interface, and memory:

receiving a first web request, requesting access to a first website;

identifying that the first website is associated with multiple categorizations;

based on identifying that the first website is associated with the multiple categorizations, redirecting the first web request to a threat analysis database engine, wherein the threat analysis database engine is configured to:

outputting a first score indicating an identified amount of danger corresponding to the first website, and storing, at a proxy content filtering engine and based on the first score, a first network action rule indicating a first network action to be performed by the computing platform with regard to the first website, accessing, from the proxy content filtering engine, the first network action rule; and executing the first network action, wherein executing the first network action comprises one of: blocking or allowing traffic to the first website.

12. The method of claim 11, wherein outputting the first score is based on comparison of the multiple categorizations to a list of known dangerous categories.

13. The method of claim 11, wherein outputting the first score is based on analysis of the first website using threat intelligence information corresponding to the first website.

14. The method of claim 13, wherein the threat intelligence information is obtained from one or more data sources using an application programming interface.

15. The method of claim 11, wherein blocking the traffic to the first website comprises blocking a port number corresponding to the first website.

16. The method of claim 11, further comprising:

receiving a second web request, requesting access to a second website;

identifying that the second website is not categorized;

based on identifying that the second website not categorized, redirecting the second web request to the threat analysis database engine, wherein the threat analysis database engine is configured to:
    output a second score indicating an identified amount of danger corresponding to the second website, and
    store, at the proxy content filtering engine and based on the second score, a second network action rule indicating a second network action to be performed by the computing platform with regard to the second website,
accessing, from the proxy content filtering engine, the second network action rule; and
executing the second network action, wherein executing the second network action comprises one of: blocking or allowing traffic to the second website.

17. The method of claim 16, wherein outputting the second score further includes outputting a proposed category for the second website.

18. The method of claim 17, further comprising:
sending, to a website categorization service, the proposed category and a request to confirm the proposed category; and
storing, for the second website and after receiving confirmation from the website categorization service that the proposed category is accurate, the proposed category.

19. The method of claim 18, wherein the second score is output within a first period of time, and confirmation is received after a second period of time, wherein the first period of time is less than the second period of time.

20. One or more non-transitory computer-readable media storing instructions that, when executed by a computing platform comprising at least one processor, a communication interface, and memory, cause the computing platform to:
receive a first web request, requesting access to a first website;
identify that the first website is associated with multiple categorizations;
based on identifying that the first website is associated with the multiple categorizations, redirect the first web request to a threat analysis database engine, wherein the threat analysis database engine is configured to:
    output a first score indicating an identified amount of danger corresponding to the first website, and
    store, at a proxy content filtering engine and based on the first score, a first network action rule indicating a first network action to be performed by the computing platform with regard to the first website,
access, from the proxy content filtering engine, the first network action rule; and
execute the first network action, wherein executing the first network action comprises one of: blocking or allowing traffic to the first website.

* * * * *